US008537816B2

(12) United States Patent
Anumala et al.

(10) Patent No.: US 8,537,816 B2
(45) Date of Patent: Sep. 17, 2013

(54) MULTICAST VPN SUPPORT FOR IP-VPN LITE

(75) Inventors: Mohnish Anumala, Littleton, MA (US); Roger Lapuh, Uesslingen (CH); Ganesh Nakhawa, Westford, MA (US)

(73) Assignee: Avaya, Inc., Basking Ridge, NJ (US)

( * ) Notice: Subject to any disclaimer, the term of this patent is extended or adjusted under 35 U.S.C. 154(b) by 169 days.

(21) Appl. No.: 12/980,885

(22) Filed: Dec. 29, 2010

(65) Prior Publication Data

US 2012/0170578 A1 Jul. 5, 2012

(51) Int. Cl.
*H04L 12/28* (2006.01)
*H04L 12/56* (2006.01)

(52) U.S. Cl.
USPC .......................................... 370/389; 370/390

(58) Field of Classification Search
USPC .................................. 370/389, 390, 391–392
See application file for complete search history.

(56) References Cited

U.S. PATENT DOCUMENTS

| | | | | |
|---|---|---|---|---|
| 7,281,058 B1* | 10/2007 | Shepherd et al. | ............. | 709/238 |
| 7,698,455 B2* | 4/2010 | Jalan et al. | ..................... | 709/238 |
| 7,768,913 B1* | 8/2010 | Shepherd et al. | ............. | 370/230 |
| 8,051,201 B2* | 11/2011 | Jalan et al. | ..................... | 709/238 |
| 8,155,125 B1* | 4/2012 | Borgione et al. | ............. | 370/397 |
| 8,310,957 B1* | 11/2012 | Rekhter | ........................ | 370/256 |
| 2006/0002370 A1* | 1/2006 | Rabie et al. | .................... | 370/351 |
| 2006/0203819 A1* | 9/2006 | Farinacci et al. | ............. | 370/390 |
| 2007/0104194 A1* | 5/2007 | Wijnands et al. | ............. | 370/390 |
| 2007/0153790 A1* | 7/2007 | Boers et al. | .................... | 370/390 |
| 2007/0217415 A1* | 9/2007 | Wijnands et al. | ............. | 370/390 |
| 2008/0075078 A1* | 3/2008 | Watanabe | ...................... | 370/390 |
| 2008/0310417 A1* | 12/2008 | Friskney et al. | ............. | 370/392 |
| 2009/0279701 A1* | 11/2009 | Moisand et al. | ............. | 380/270 |
| 2010/0202312 A1* | 8/2010 | Eswaran | ........................ | 370/252 |
| 2010/0220723 A1* | 9/2010 | Jalan et al. | ..................... | 370/390 |
| 2010/0254261 A1* | 10/2010 | Dattagupta et al. | ........... | 370/230 |
| 2010/0265869 A1* | 10/2010 | Sarikaya | ........................ | 370/312 |
| 2010/0265947 A1* | 10/2010 | Kokot et al. | ................... | 370/390 |
| 2012/0120952 A1* | 5/2012 | Jalan et al. | ..................... | 370/390 |
| 2012/0163373 A1* | 6/2012 | Lo et al. | ........................ | 370/354 |

OTHER PUBLICATIONS

Rosen, Eric C., et al., "Multicast in MPLS/BGP IP VPNs", Jan. 28, 2010, pp. 89.
Aggarwal, Rahul, et al., "IPv4 and IPv6 Infrastructure Addresses in MCAST-VPN Routes", Nov. 8, 2010, pp. 8.
Cisco Systems Inc., "Multicast Virtual Private Networks Concepts Cisco", 1992-2002 Cisco Systems, Inc, pp. 1-10.
Juniper Networks, Inc., MBGP-Based Multicast VPN's, Juniper Networks, Inc., Copyright 1999-2010, pp. 1-4.

* cited by examiner

*Primary Examiner* — Chuong T Ho

(74) *Attorney, Agent, or Firm* — Anderson Gorecki & Rouille

(57) ABSTRACT

Techniques disclosed herein include systems and methods for providing multicast Virtual Private Network (VPN) support for IP VPN networks, including IP VPN-lite networks. Such techniques provide multicast VPN capability over an IP unicast core network by creating a multicast service VLAN and IP interface, which is used for multicast control traffic exchange between VPN instances. Multicast VPN data traffic is then carried over unicast IP-in-IP tunnels. A given ingress Provide Edge (PE) replicates the multicast traffic for all receiving egress PEs, and adds control information so that the multicast traffic appears as unicast traffic to the Core network. With such a technique, a given Core network only needs to run an IP unicast that is free of VPN unicast or multicast route or tree information.

16 Claims, 6 Drawing Sheets

MULTICAST VPN SUPPORT FOR IP-VPN LITE

BACKGROUND

The present disclosure relates to network computing. Computer networks typically include a collection of computing devices enabled to communicate with each other for handling data traffic and control instructions. For example, such devices can include servers, data centers, routers, network switches, bridges, hubs, management applications, wireless access points, and client computers. Computer networks can provide network connectivity to wired computing devices and/or wireless computing devices. Some network computing devices, such as network switches, are used to connect network segments. Network switches process data, such as data packets, and forward the data to and from source and destination devices. Network switches can also include functionality for routing data in addition to forwarding operations.

Computer networks can include various configurations. One such configuration, known as a virtual private network (VPN), is a network that operates over a public communication network (such as the Internet) to provide remote offices or individual clients with secure, private access to a specific network, such as a network specific to an organization or company. VPNs function by encapsulating data transfers between two or more networked devices not on the same private network. Such encapsulation keeps transferred data private from other devices on one or more intervening local area networks or wide area networks. A VPN can enable a group of client computers to communicate and access specific resources as members of a given broadcast domain even if the various member client computers are not attached to the same network switch.

One type of data delivery technique is referred to as a multicast. A data multicast, also known as multicasting, involves simultaneously delivering information to a group of recipients (usually client computers), typically beginning from a single transmission. Thus, a multicast is a one-to-many distribution. Multicasting typically limits the group of recipients to members of a specific multicast receiver group. During data transport, network devices make copies of multicast data typically only when necessary, such as when member recipients are located on different networks or sub-networks. Related delivery techniques include broadcast (one-to-all), and unicast (one-to-one).

SUMMARY

IP VPN-lite is a data networking technology that enables Internet Protocol (IP) virtual private networks (VPNs) using Multiprotocol Border Gateway Protocol (MP-BGP) extensions (based on RFC 4364) across a conventional IP backbone infrastructure. IP VPN-lite typically functions as an end-to-end IP transport mechanism. Accordingly, IP VPN-lite runs on a native IP core network rather than a Multiprotocol Label Switching (MPLS) enabled core network. IP VPN-lite is explained in more detail in U.S. patent application Ser. No. 11/935,563, filed on Nov. 6, 2007, entitled "Supporting BGP Based IP-VPN In A Routed Network," and in U.S. patent application Ser. No. 12/492,548, filed on Jun. 26, 2009, entitled "Method And Apparatus For Implementing L2 VPNs On An IP Network," both of which are incorporated by reference in their entirety.

One challenge with IP VPN is that it only supports unicast traffic because of its dependence on BGP based IP VPN. There is an increasing demand for Multicast support for IP VPN deployments, especially to run IP multicast traffic natively on existing IP core networks. Conventional attempts to provide multicast support focus on creating multicast trees in the core network based on Label Distribution Protocol (LDP) and Resource Reservation Protocol (RSVP), to map VPN multicast traffic into multicast tunnels created in the core of the network. This solution is not ideal because it requires the core network to provide two logical networks, which means that unicast and multicast traffic can take different paths. Furthermore, most core networks simply provide point-to-point capability, and do not offer much or any multicast support. Some conventional attempts require a Protocol Independent Multicast-Sparse-Mode (PIM-SM) based multicast session (S,G) per VPN in the core of the network. If a given single multicast traffic session in a VPN exceeds a certain percentage of a line-rate, then a new PIM source-specific multicast (PIM-SSM) core multicast session must be created with the source Provider Edge (PE) as the Routing Point (RP).

Such a conventional approach has several disadvantages. For example, it is difficult to scale because of the (S,G) per VPN requirement. The core network becomes dynamic requiring creation/deletion of PIM-SSM streams that carry significant multicast traffic. Conversely, if source specific streams are avoided to keep the core stable, there may be significant drops at the remote PEs, which have not joined the Virtual Route Forwarder (VRF) multicast session but are part of the same VPN multicast tree resulting in poor performance of the multicast VPN network. Thus, such conventional approaches result in poor network performance if a customer chooses to keep the core of the network stable. If the customer wants to maximize network performance, then VPN scalability is limited because many customer specific multicast sessions may require dedicated source specific multicast sessions in the core network. A result is that network administrators must constantly monitor to strike a balance between stability, scalability, and performance.

Techniques disclosed herein include systems and methods for providing multicast VPN support for IP VPN networks. Such techniques provide multicast VPN capability over an IP unicast core network by creating a multicast service VLAN and IP interface, which is used for multicast control traffic exchange between VPN instances. Multicast VPN data traffic is then carried over unicast IP-in-IP tunnels. Such multicast VPN data traffic can include Layer 3 traffic going over an IP backbone as a virtual network.

In one embodiment, a multicast manager process is included with a device that provides packet switching and routing in a computer network. The multicast manager examines control information of a multicast data packet received at a first data switching device. The multicast data packet includes control information and a payload. Control information includes any header or source/destination information. The multicast data packet is received as part of a virtual private network (VPN). The multicast manager identifies remotely attached data switching devices to which to forward the multicast data packet based on the control information. For example, the routing tables can identify remote nodes based on Source Group (S,G) information, necessary for correct multicast delivery. The remotely attached data switching devices are logically connected to the first data switching device via a service provider network, such a third-party intermediate or Core network. The multicast manager replicates the multicast data packet for each identified remotely attached data switching device. The multicast manager encapsulates each replicated multicast data packet with outer header information. This outer header information identifies each replicated multicast data packet as a unicast data packet. The multicast manager or other module then forwards each encapsulated and replicated multicast data packet to a corresponding remotely attached data switching device via a logical unicast tunnel of the service provider network.

In another embodiment, the multicast manager receives, via the logical unicast tunnel within the service provider network, a second multicast data packet from a remotely attached data switching device. This second multicast data packet is encapsulated with an outer header identifying the second multicast data packet as a unicast data packet. The multicast manager then decapsulates the outer header of the second multicast data packet, and then executes a multicast routing operation on the second multicast data packet based on corresponding control information. Such a multicast routing operation can include forwarding the multicast data packet to locally attached Customer Edge devices having multicast recipients.

There are several advantages of such multicast techniques. One advantage is a stable core network using fixed core multicast trees. The multicast process is highly scalable—large numbers of multicast VPNs can be easily created and managed. Also, after initial setup there is no state change in the core network. The result is a high performance multicast network because of the separation of multicast session management and multicast flow management. VPN multicast flows can be created/deleted faster without tree calculation overhead because each VPN flow will use a sub-tree of the core multicast tree.

Yet other embodiments herein include software programs to perform the steps and operations summarized above and disclosed in detail below. One such embodiment comprises a computer program product that has a computer-storage medium (e.g., a non-transitory, tangible computer readable storage media, disparately located or commonly located storage media, computer storage media or medium, etc.) including computer program logic encoded thereon that, when performed in a computerized device having a processor and corresponding memory, programs or causes the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations multicast data communication such as: examining control information of a multicast data packet received at a first data switching device, the multicast data packet including control information and a payload, the multicast data packet received as part of a virtual private network (VPN); identifying remotely attached data switching devices to which to forward the multicast data packet based on the control information, the remotely attached data switching devices being logically connected to the first data switching device via a service provider network; replicating the multicast data packet for each identified remotely attached data switching device; encapsulating each replicated multicast data packet with outer header information, the outer header information identifying each replicated multicast data packet as a unicast data packet; and forwarding each encapsulated and replicated multicast data packet to a corresponding remotely attached data switching device via a logical unicast tunnel of the service provider network. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting packet switching, routing, and multicast data transport across a communication network. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for providing multicast Virtual Private Network (VPN) support for IP VPN networks. Such techniques provide multicast VPN capability over an IP unicast core network by creating a multicast service VLAN and IP interface, which is used for multicast control traffic exchange between VPN instances. Multicast VPN data traffic is then carried over unicast IP-in-IP tunnels. A given ingress Provide Edge (PE) replicates the multicast traffic for all receiving egress PEs, and adds control information so that the multicast traffic appears as unicast traffic to the Core network. With such a technique, a given Core network only needs to run an IP unicast that is free of VPN unicast or multicast route or tree information. PIM instances are connected by simple VLAN (MS-VLAN) rather than complicated protocol extensions.

Figure 1:
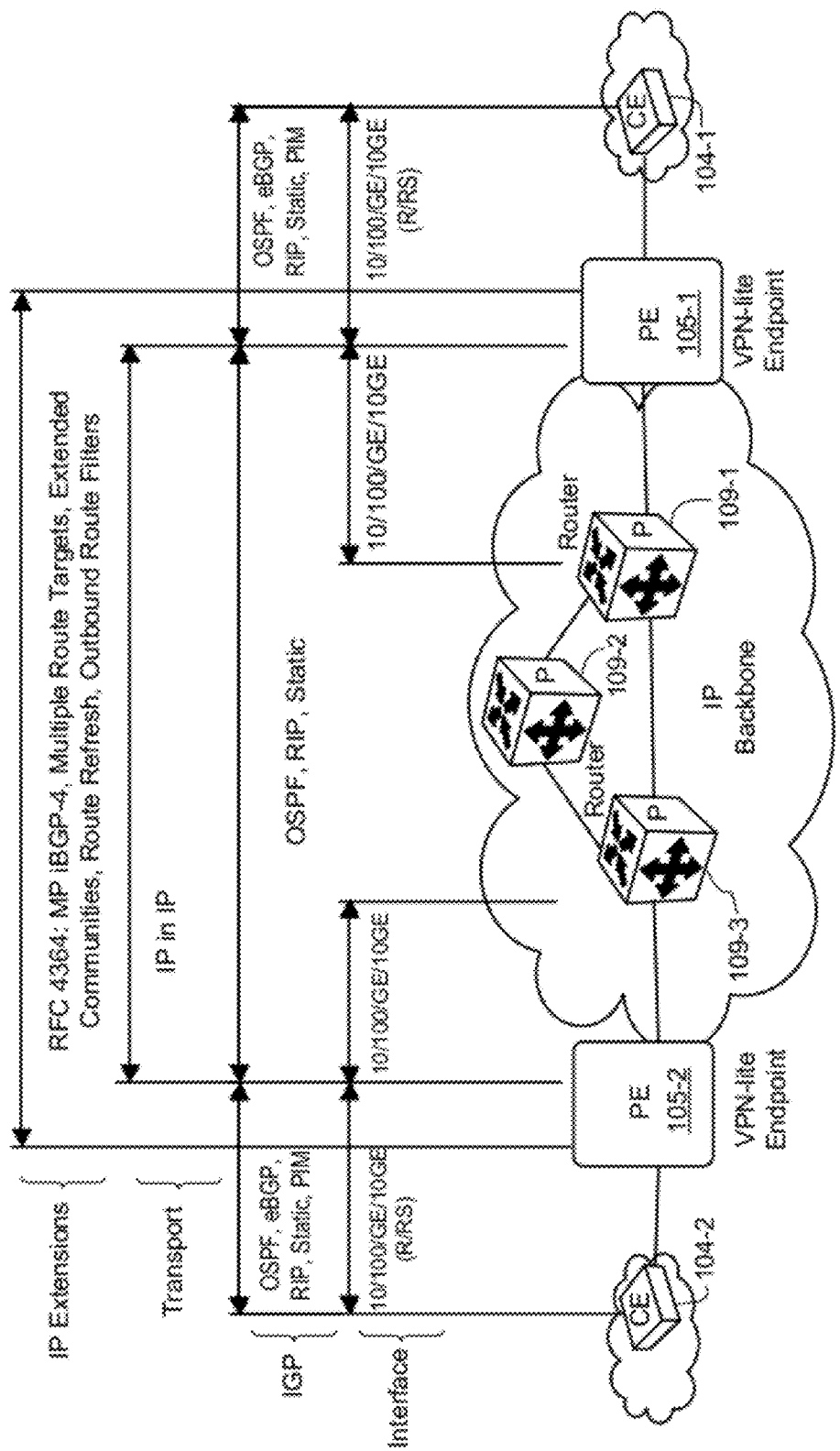
FIG. 1 is network diagram illustrating example architecture of IP-VPN lite architecture.

FIG. 1 is a diagram illustrating an overview of IPVPN-lite. An IPVPN-lite network consists of customer edge routers 104 referred to as CE devices, edge routers 105 referred to as PE (provider edge) routers/devices and core routers 109 referred to as P (provider) routers. Customer/end-user data traffic is carried in IP-in-IP data format over the core network. The core network is also known as a service provider network or carrier network, and provides an IP backbone for data transport.

In IPVPN-lite deployment, Provider routers perform routing functions using Interior Gateway Protocol (IGP), such as Open Shortest Path First (OSPF) or Routing Information Protocol (RIP). Provider routers are typically not aware of any VPN specific routing information. These Provider devices provide connectivity between Provider Edge devices. Provider devices perform routing operations on an outer IP header of VPN data (IP-in-IP) traffic.

Customer Edge devices perform routing operations in the context of a customer/end-user VPN. Customer Edge devices are connected to Provider Edge devices. Routing information is exchanged between PE devices and CE devices using IGP (OSPF/RIP) or external Border Gateway Protocol (eBGP). A given CE device receives and transmits data traffic in native IP format.

In IPVPN-lite deployment, Provider Edge routers in the network exchange VPN routing information using Multi-protocol extensions to BGP (MP-BGP). This control operation is executed by creating an MP-BGP full mesh between Provider Edge devices, or using a route reflector (RR) feature in BGP. Route reflector creates a hub and spoke model for Provider Edge devices in the IPVPN-lite deployment. A Service IP address is defined as a loop-back IP address, which is associated with a Provider Edge device and one or more virtual route forwarders (VRF) in the Provider Edge device.

Upon accepting customer data traffic from a given CE device, the Provider Edge device executes several steps. Such steps include performing VPN classification of the CE data traffic, performing a routing operation in the associated VRF (virtual route forwarder) context, and encapsulating a corresponding data IP packet from the CE device with an IP header. The destination IP of the IP header is a remote VRF's service IP address, which corresponds to a remote PE-VRF for which the data IP packet is destined. Source IP of the IP header is the local VRF's service IP address, that is, the inbound PE packet's associated VRF.

Upon receiving VPN data traffic from a Provider device/router, the Provider Edge device executes additional steps including: performing VPN classification based on outer destination service IP address, decapsulating the VPN data packet's IP header, performing a routing operation in the associated VRF (virtual route forwarder) context, and encapsulating the data packet with the Ethernet header and forwarding it to the Customer Edge device.

Techniques disclosed herein provide multicast support for IPVPN-lite. To support multicast data traffic in the VPN, a multicast routing protocol (like Protocol Independent Multicast (PIM)) is enabled in the virtual route forwarder (VRF). Virtual Route Forwarders (VRFs) provide traffic isolation between customers operating over a same node. A virtual router emulates the behavior of a dedicated hardware router by providing separate routing functionality, and is treated by the network as a separate logical router. Each VRF is capable of routing traffic among the IP interfaces directly connected to it without Multiprotocol Label Switching (MPLS) encapsulation. FIG. 1 also shows PIM enablement in the VRFs.

PIM enabled VRF instances running in various PE devices across the network need to exchange multicast routes. Such route exchanges can be accomplished by connecting the PIM instances running in a customer VPN-VRFs using an extended VLAN. Such a VLAN extends over the IPVPN-lite core network. An IP interface or L2 interface is created on this VLAN. This extended VLAN is referred to as "Multicast Service VLAN" (MS-VLAN). One MS-VLAN is created per VPN. The VLAN is not known logically to the core network. Thus, connectivity operates as L2 running on top of IP for PIM routers to discover each other and exchange control information. The VPN can be thought of as a group of interconnected VRFs. The overlay provides a VLAN that is an any-to-any L2 broadcast domain.

Figure 2:
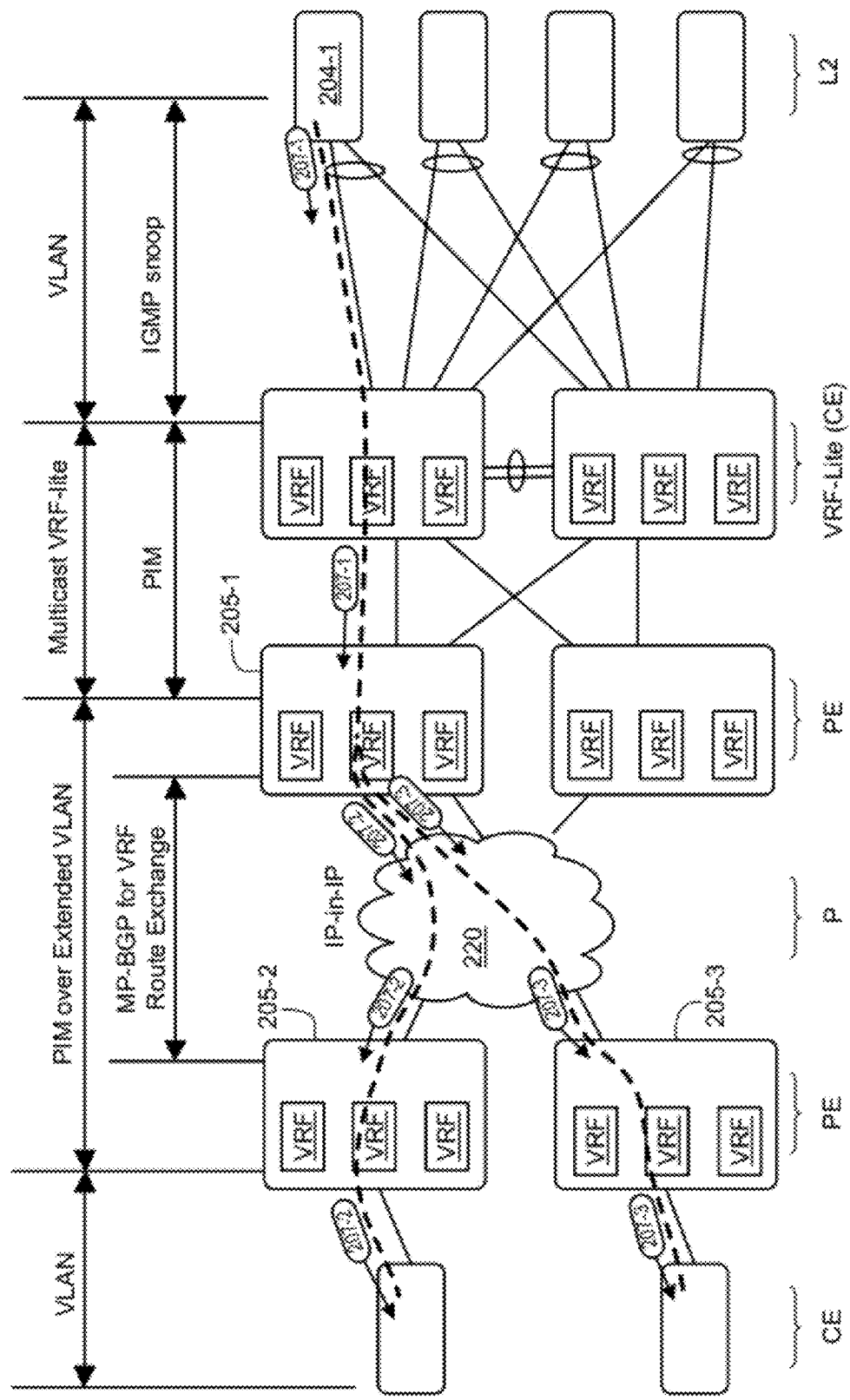
FIG. 2 is a network diagram illustrating multicast functionality of an IP-VPN lite network according to embodiments herein.

FIG. 2 is a diagram illustrating an end-to-end network level view of the IPVPN-lite multicast. FIG. 2 illustrates how the multicast enabled VRFs can be connected, such as by using native VLANs between PE devices, using MS-VLAN over the IPVPN-lite or a combination of both. Note that this MS-VLAN is typically limited to carrying multicast protocol control traffic only. The purpose of this VLAN is to provide connectivity between PIM/VRF instances. There are two methods for deploying MS-VLAN: (1) a bridged VLAN across the network infrastructure; or (2) an end-point-configured (Provider-edge PE) VLAN (possible Layer 2 (L2) VPN-lite extension to connect edge routers).

Typically, the MS-VLAN does not carry VRF customer multicast data traffic. VRF multicast traffic, destined for remote PE devices, is replicated in an ingress Provider Edge device. Each individual replica is then carried to the remote PE device(s) using unicast IP-in-IP encapsulation, that is, IP encapsulation of IP packets.

As part of initialization of the multicast system, PIM neighbors need to be mapped on MS-VLAN to an IP-in-IP tunnel. Address Resolution Protocol (ARP) and Media Access Control (MAC) addresses are exchanged over the MS-VLAN to establish PIM connectivity. This address exchange provides a mapping of PIM neighbor connectivity over the IPVPN-lite protocol using an IP-in-IP encapsulation.

In practice, upon accepting customer multicast data traffic from the CE device, the multicast manager or Provider Edge device executes several steps. The multicast manager executes a VPN classification of the CE data traffic, and also executes a multicast routing operation in an associated VRF (virtual route forwarder). This classification and routing results in a receiver set of directly attached routers and remotely attached PE devices. A given PE device will then replicate the CE packet for each directly attached router and send these replicas to corresponding local PE or CE devices. The PE also replicates the CE packet for each remotely attached PE device and, as an additional step, encapsulates each replica of the packet with an outer IP header. A destination IP of the outer IP header is the remote VRF's service IP address. This service IP address corresponds to the remote PE-VRF for which the packet is destined. The Source IP of the outer IP header is the local VRF's service IP address, that is, the inbound PE packet's associated VRF.

Either the remote PE device or the ingress PE device can execute additional steps in response to receiving a data packet with the outer IP header. Upon receiving VPN multicast data traffic from a given remote Provider device, the multicast manager executes a VPN classification based on outer destination service IP address. The multicast manager then decapsulates the VPN data packet's outer IP header and executes a multicast routing operation in the corresponding VRF (virtual route forwarder). The PE can then encapsulate the data packet with an Ethernet header and forward the data packet to a corresponding CE device. When the packet is received from the Provider device, the Provider Edge device will not send a replica of the packet back to the Provider device.

For example, CE device 204-1 transmits multicast data packet 207-1, which is then received at PE device 205-1. More specifically, data packet 207-1 is received at a VRF operating within PE device 205-1. PE 205-1 examines data packet 207-1 and identifies remote PE devices 205-2 and 205-3 that are nodes along the multicast distribution. PE 205-1 then replicates data packet 207-1 to create replicas 207-2 and 207-3. Each of these replicated data packets is then encapsulated with an IP header for transmission along an IP unicast tunnel through Core network 220. Note that Core network 220 can include many routers, and that each of data packets 207-2 and 207-3 can pass through a same Provider router. This is because the Provider router does not provide multicast support and/or because data packets 207-2 and 207-3 are encapsulated as unicast data packets. While such a mechanism can increase a number of multicast data packets transmitted though the core network, the core network remains fast and stable since the core network is not managing multicast trees.

VPN multicast traffic flow in the core of the network is then identified using Service (S,G), Multicast Route Target (MRT) and a VRF flow ID in the MVPN-lite session header. For better operation, Provider Edge and Provider routers support VPN Multicast Flow Protocol (VMFP) for MVPN-lite. VMFP is Transmission Control Protocol (TCP) based, and opens a TCP connection with both downstream and upstream devices for all core PIM source-specific multicast (PIM-SSM) service (S,G) sessions. This is a type-length-value (TLV) based protocol used to manage VPN multicast flows. A VMFP device can request "VPN multicast flow prune" to the upstream device. VMFP devices can also request "VPN multicast flow join" to the downstream device.

As with most data switching devices, embodiments can include a control plane and a forwarding plane. Regarding an MVPN-lite device control plane, Provider devices can be enabled to support VMFP and PIM-SSM, with Provider Edge devices enabled to support VMFP and PIM-SSM in a base routing instance and to support Internet Group Management Protocol (IGMP)/PIM-SM in a given VRF instance. When a given Provider Edge or Provider device boots up, the device will acquire a list of PIM-SSM service (S,G) sessions that it needs to join. The given Provider Edge or Provider device will typically join a number of sessions equal to a number of PE devices in the network. Such joining establishes core multicast trees rooted at each PE device to reach remote PE devices. A given core multicast tree rooted at a PE device carries all corresponding VPN traffic.

Typically, there are no separate VPN multicast trees. Each VRF on a PE device is configured with a multicast route target. VRFs belonging to a same customer VPN on various PE devices are configured with the same multicast route target. The multicast route target for each customer VPN can be unique in the core network. Note that there can be different import/export MRTs. When a VRF is instantiated in a Provider Edge, the VRF it will inform its MRT to a base routing instance. VMFP in the base router can then issue VPN multicast flow joins to corresponding upstream devices using the PIM-SSM service (S,G) sessions, VRF MRT and flow ID=0. The Provider Edge will not receive multicast traffic for that VRF until the VMFP join is issued with flow ID=0.

When a Provider device receives a VMFP multicast flow join, the Provider device will update its multicast forwarding table. The Provider device will then send VMFP multicast flow join to the upstream Provider devices for the PIM-SSM service (S,G) sessions. This VMFP join propagation towards a Routing Point PE for the service (S,G) session happens when a new VRF is created or initialized. Similarly when a VRF multicast is deleted/disabled in the PE device, VMFP prune instructions propagate towards the Routing Point PE for the service (S,G) session.

If a particular customer multicast session transmits significant traffic and does not require all member VPN nodes to receive associated traffic, then the particular VRF may assign a flow ID ($\neq 0$) to this customer multicast session. That means a corresponding MVPN-lite session header is going to have a non-zero flow ID. Flow ID is typically unique for a Routing Point, which means the flow ID is unique with the service (S,G) and MRT combination. When the receiving PE detects a non-zero flow ID and the corresponding local VRF with matching importing MRT does not have a receiver, then the receiving PE issues a VPN multicast flow prune command to the upstream device for the service (S,G).

If a local VRF has a receiver, then the local VRF issues a VPN multicast flow join to the upstream device. If the receiving PE issued a VPN multicast flow prune to the upstream device, and at a later point of time a receiver joined in the local VRF, then the local VRF can find the flow ID from its "flow prunes table" and issue a VPN multicast flow join to the upstream device using this VPN multicast flow ID. When a customer multicast session from a sending PE with a non-zero flow ID ceases to exist, then the sending PE (SSM-RP) base routing instance VMFP will issue a VPN multicast prune to the downstream devices. The downstream Provider device can then issue VPN multicast prunes to its downstream devices for the service (S,G). This process continues until all PE devices receive this message.

In other words, in this solution, core multicast trees are created/managed by PIM-SSM. Device forwarding tables are controlled by VMFP. This makes core networks very stable because core multicast trees are not dynamically modified (unless there are addition/deletion of PE devices) and the forwarding table is controlled by VMFP running on top of TCP, thereby enabled to make adjustments to network congestion. When network deployment only supports VPN broadcast, then a number of VPNs can scale to a very high number and remain stable because the number of core multicast trees is equal to the number of PE devices, and VMFP/TCP based flow per VPN joins occur only once. When network deployment supports VPN multicast, then the network is stable and used to maximum performance because the number of core multicast trees is equal to number of PE devices, and VMFP/TCP based multicast flow joins/prunes occur resulting in managing flow forwarding entries in a relatively shorter time.

Regarding the MVPN-lite device forwarding plane, the ingress PE multicast device executes a lookup on the customer (S,G) within the VRF multicast forwarding table and executes service (S,G), MVPN-lite session header encapsulation. A format of the packet transmitted to a core device can be structured with the sequence: Ethernet Header; the Service IP Header (S,G,); MVPN-lite Session header; Customer IP Payload. A format of the MVPN-lite session header can be structured with the sequence: Multicast route target (32 bits); VPN Multicast Flow ID (16 bits); Future use (16 bits).

An intermediate Provider device performs a Longest Prefix Match (LPM) lookup on (Service S,G+ MRT+ Flow ID). A Provider device's forwarding table can then have a Service (S,G) entry set to drop the packet. This mechanism avoids flooding. The egress Provider Edge then performs a lookup on (Service S,G+ MRT) to determine the VRF context for multicast routing. The VRF then uses customer (S,G) to multicast route the packet within the VRF. For non-zero flow ID packets, an optimization can be executed by the egress PE by performing a lookup on (Service S,G+ MRT+ Flow ID) to determine ultimate receivers in the VRF.

Advantages of such multicast techniques include providing a stable core network using fixed core multicast trees. While the system can use PIM-SSM for setting up core multicast trees, there is no requirement that PIM is the only core multicast protocol. Alternatively, the system can use Provider Link State Bridging (PLSB), mLDP, RSVP, or other protocols to create a core multicast tree. The system is highly scalable. A relatively large number of multicast VPNs can be created and managed easily using this solution. For a broadcast VPN, after setup there is no state change in the core network. Another advantage is a high-performance multicast network because of the separation of multicast session management and multicast flow management. VPN multicast flows can be created/deleted faster without tree calculation overhead because each VPN flow can use a sub-tree of the core multicast tree. There is no need to design yet another method to create multicast trees. MVPN uses existing and emerging multicast protocols to create multicast trees.

Figure 4:
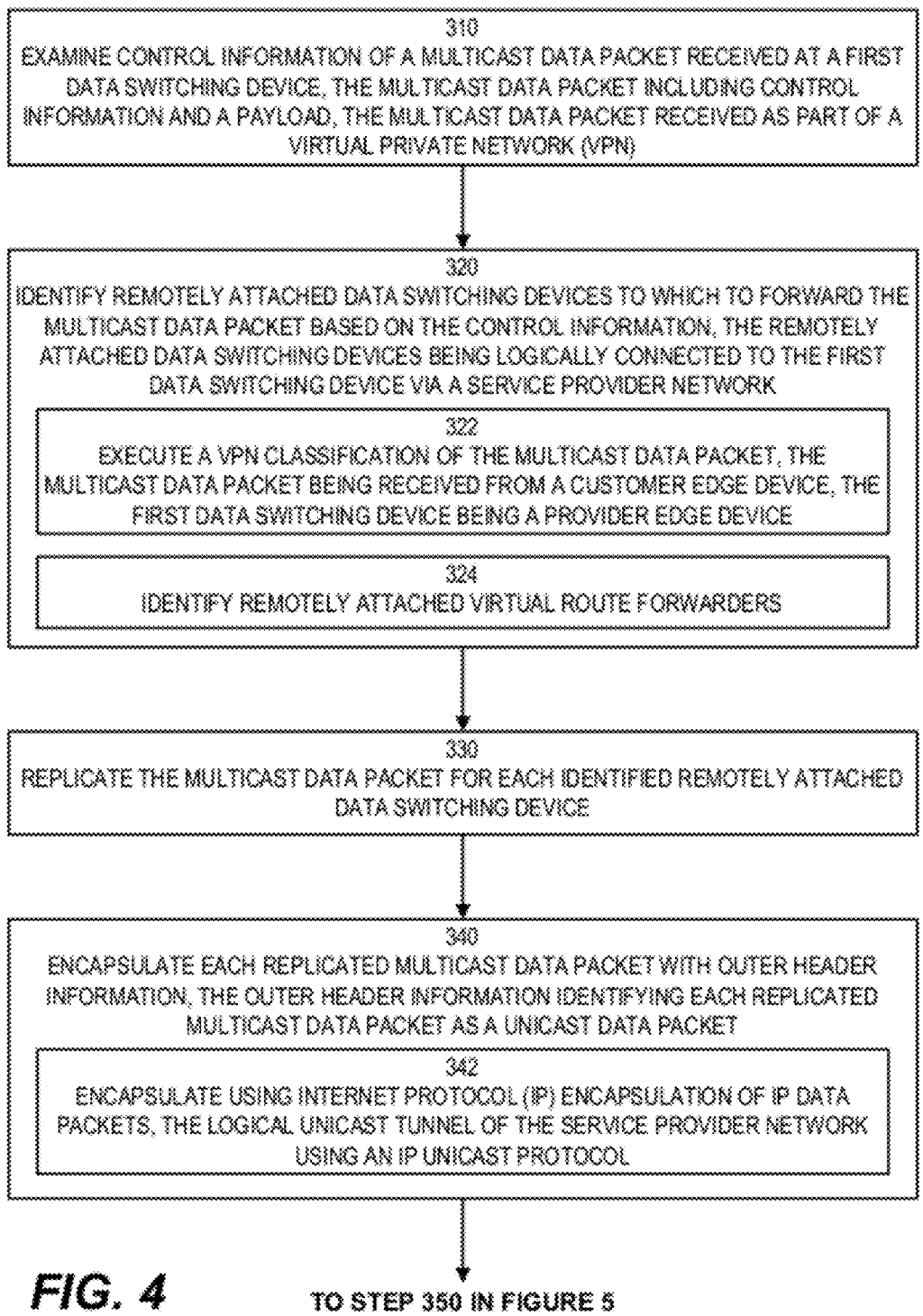
FIGS. 4-5 are a flowchart illustrating an example of multicast data communication according to embodiments herein.

Functionality associated with the multicast manager will now be discussed via flowcharts and diagrams in FIG. 4 through FIG. 6. For purposes of the following discussion, the multicast manager 140, as shown in FIG. 6, or other appropriate entity performs steps in the flowcharts.

Figure 3:
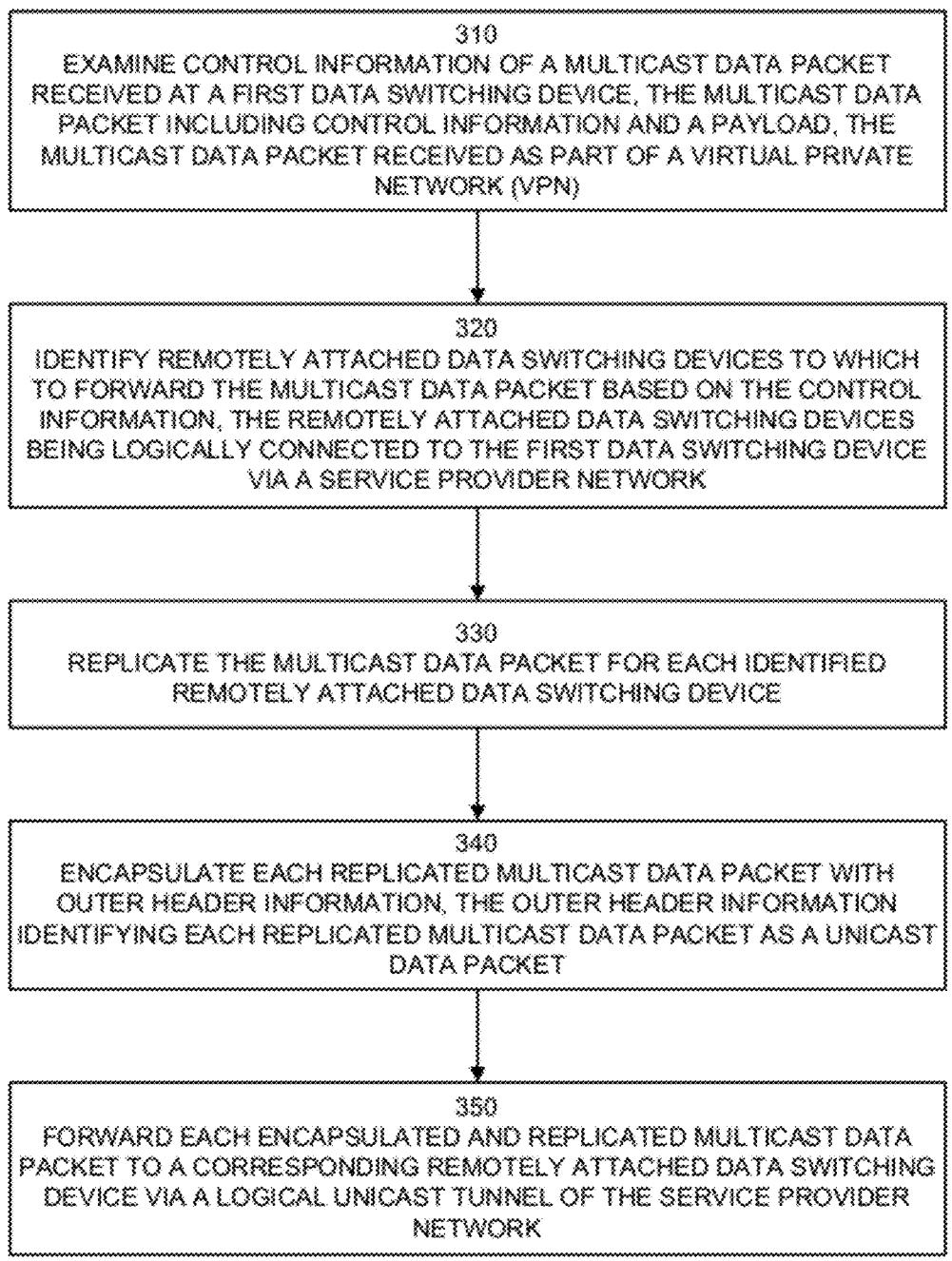
FIG. 3 is a flowchart illustrating an example of multicast data communication according to embodiments herein.

Now describing embodiments more specifically, FIG. 3 is a flow chart illustrating embodiments disclosed herein.

In step 310, multicast manager examines control information of a multicast data packet received at a first data switching device. The multicast data packet includes control information and a payload. The multicast data packet is received as part of a virtual private network (VPN) or received within a VPN. For example, upon receiving the multicast data packet, the multicast manager examines header and/or trailer information or other control information. The data switching device can be any device having the functionality to receive and forward data packets as part of a packet-switched network. The multicast data packet can be received via a User Network Interface (UNI).

In step 320, the multicast manager identifies remotely attached data switching devices to which to forward the multicast data packet based on the control information. The remotely attached data switching devices are logically connected to the first data switching device via a service provider network. In other words, remotely attached devices are accessible via a third-party carrier network of one or more data switching devices or routers. The control information can indicate source and destination addresses.

In step 330, multicast manager replicates the multicast data packet for each identified remotely attached data switching device or remote VRF. Note that the data switching device does not need to replicate for each client destination, but just for each member VRF or Provider Edge device. The member VRFs can then replicate and route within a given customer network, that is, continue replicating according to multicast tree replication logic.

In step 340, the multicast manager encapsulates each replicated multicast data packet with outer header information. The outer header information identifies each replicated multicast data packet as a unicast data packet or packet labeled for traveling between the first data switching device an a given remote data switching over a unicast path.

In step 350, the multicast manager forwards each encapsulated and replicated multicast data packet to a corresponding remotely attached data switching device via a logical unicast tunnel of the service provider network. This forwarding can include forwarding via a Network to Network Interface (NNI).

Figure 5:
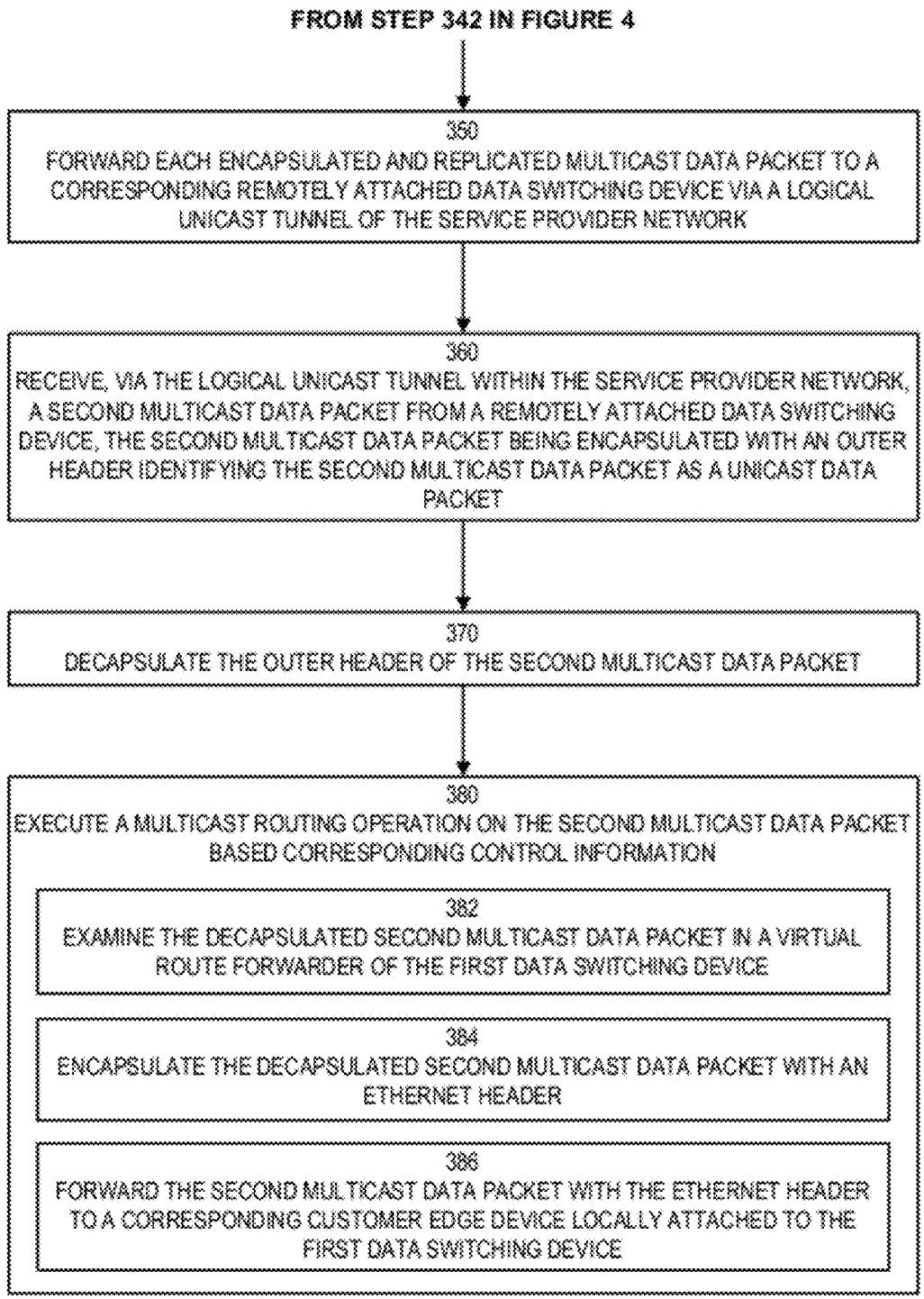
Figure 6:
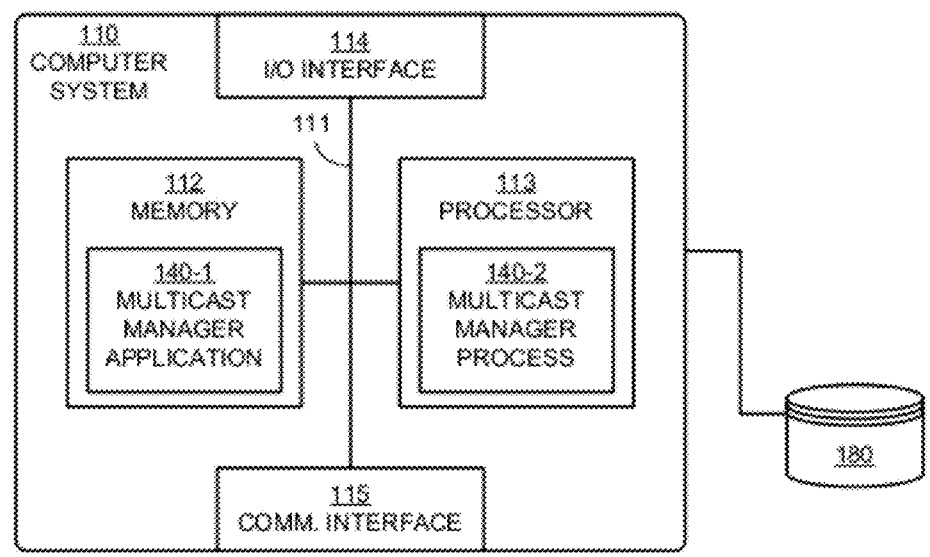
FIG. 6 is an example block diagram of a network data transport device operating in a computer/network environment according to embodiments herein.

FIGS. 5-6 include a flow chart illustrating additional and/or alternative embodiments and optional functionality of the multicast manager 140 as disclosed herein.

In step 310, the multicast manager examines control information of a multicast data packet received at a first data switching device. The multicast data packet includes control information and a payload (user data). The multicast data packet is received as part of a virtual private network (VPN).

In step 320, the multicast manager identifies remotely attached data switching devices to which to forward the multicast data packet based on the control information, such as packet headers. The remotely attached data switching devices are logically connected to the first data switching device via a service provider network.

In step 322, the multicast manager executes a VPN classification of the multicast data packet. The multicast data packet is received from a Customer Edge device. The first data switching device is a Provider Edge device. The VRF or VPN classification can be defined by port or by VLAN.

In step 324, the multicast manager identifies remotely attached virtual route forwarders. Note that each Provider Edge device can include multiple VRFs.

In step 330, the multicast manager replicates the multicast data packet for each identified remotely attached data switching device.

In step 340, the multicast manager encapsulates each replicated multicast data packet with outer header information. This outer header information identifies each replicated multicast data packet as a unicast data packet, or otherwise enables each replicated multicast data packet to be transported via a unicast tunnel.

In step 342, the multicast manager encapsulates data packets using Internet Protocol (IP) encapsulation of IP data packets. The logical unicast tunnel of the service provider network uses an IP unicast protocol for data transport.

In step 350, the multicast manager forwards each encapsulated and replicated multicast data packet to a corresponding remotely attached data switching device via a logical unicast tunnel of the service provider network.

In step 360, the multicast manager receives, via the logical unicast tunnel within the service provider network, a second multicast data packet from a remotely attached data switching device. This second multicast data packet is encapsulated with an outer header identifying the second multicast data packet as a unicast data packet.

In step 370, the multicast manager decapsulates the outer header of the second multicast data packet.

In step 380, the multicast manager executes a multicast routing operation on the second multicast data packet based on corresponding control information.

In step 382, the multicast manager examines the decapsulated second multicast data packet in a virtual route forwarder of the first data switching device.

In step 384, the multicast manager encapsulates the decapsulated second multicast data packet with an Ethernet header.

In step 386, the multicast manager forwards the second multicast data packet with the Ethernet header to a corresponding Customer Edge device locally attached to the first data switching device. Locally attached means that there is no provider or third party network between the first data switching device and the Customer Edge device, but there can be intervening customer devices.

In other embodiments, the multicast manager exchanges VPN routing information with remotely attached switching devices using Multi-Protocol extensions to Border Gateway Protocol (MP-BGP). Each data switching device has one or more virtual route forwarders. The multicast manager, or system, also enables a multicast routing protocol in each virtual route forwarder. The multicast manager can also connect Protocol Independent Multicast (PIM) instances within the virtual route forwarders of the VPN using an extended Virtual Local Area Network (VLAN). This extended VLAN includes an Internet Protocol (IP) interface. Note that the VRFs do not need to directly communicate with each other, but can communicate via a node called a Global Routing Engine (GRE) within each Provider Edge device. The VRFs then export their routes into the BGP, and then the BGP exchanges this routing information between Provider Edge devices.

The multicast manager can also replicate the multicast data packet for each directly attached Customer Edge (CE) device, and forwarding replicated multicast data packets to corresponding CE devices without encapsulating the multicast data packet with the unicast outer header information. In this situation, the multicast manager can use multicast routing protocols and select trees without needing IP-in-IP encapsulation, and execute routing by calculating shortest paths, load balancing, etc.

FIG. 6 shows an example physical embodiment according to techniques disclosed herein. In FIG. 6, computer system 110 is shown for executing a multicast manager 140 process either automatically, or in response to user input. Repository 180 can optionally be used for storing client data both before and after processing.

Note that the following discussion provides a basic embodiment indicating how to carry out functionality associated with the multicast manager 140 as discussed above and below. It should be noted, however, that the actual configuration for carrying out the multicast manager 140 can vary depending on a respective application. For example, as previously discussed, computer system 110 can include one or multiple computers that carry out the processing as described herein.

In different embodiments, computer system 110 may be any of various types of devices, including, but not limited to, a network switch, a router, a wireless access point, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to any peripheral devices such as a keyboard, selection tool to move a cursor, display screen, etc.

Communications interface 115 enables the multicast manager 140 of computer system 110 to communicate over a network and, if necessary, retrieve any data required to create views, process content, communicate with a user, etc. according to embodiments herein.

As shown, memory system 112 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 113 in the computer system 110.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a tangible (non-transitory) computer readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 112.

In addition to these embodiments, it should also be noted that other embodiments herein include the execution of the multicast manager 140-1 in processor 113 as the multicast manager process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for multicast data communication, the computer-implemented method comprising:

examining control information of a multicast data packet received at a first data switching device, the multicast data packet including control information and a payload, the multicast data packet received as part of a virtual private network (VPN);

identifying remotely attached data switching devices to which to forward the multicast data packet based on the control information, the remotely attached data switching devices being logically connected to the first data switching device via a service provider network, wherein identifying remotely attached data switching devices to which to forward the multicast data packet based on the control information includes identifying remotely attached virtual route forwarders;

replicating the multicast data packet for each identified remotely attached data switching device;

encapsulating each replicated multicast data packet with outer header information, the outer header information identifying each replicated multicast data packet as a unicast data packet;

forwarding each encapsulated and replicated multicast data packet to a corresponding remotely attached data switching device via a logical unicast tunnel of the service provider network;

exchanging VPN routing information with remotely attached switching devices using Multi-Protocol extensions to Border Gateway Protocol (MP-BGP), each data switching device having one or more virtual route forwarders; and enabling a multicast routing protocol in each virtual route forwarder.

2. The computer-implemented method of claim 1, further comprising:

receiving, via the logical unicast tunnel within the service provider network, a second multicast data packet from a remotely attached data switching device, the second multicast data packet being encapsulated with an outer header identifying the second multicast data packet as a unicast data packet;

decapsulating the outer header of the second multicast data packet; and executing a multicast routing operation on the second multicast data packet based on corresponding control information.

3. The computer-implemented method of claim 2, wherein executing the multicast routing operation on the second multicast data packet based on corresponding control information comprises:

examining the decapsulated second multicast data packet in a virtual route forwarder of the first data switching device;

encapsulating the decapsulated second multicast data packet with an Ethernet header; and forwarding the second multicast data packet with the Ethernet header to a corresponding Customer Edge device locally attached to the first data switching device.

4. The computer-implemented method of claim 1, wherein identifying remotely attached data switching devices to which to forward the multicast data packet includes executing a VPN classification of the multicast data packet, the multicast data packet being received from a Customer Edge device, the first data switching device being a Provider Edge device.

5. The computer-implemented method of claim 4, further comprising:

wherein encapsulating each replicated multicast data packet with outer header information includes Internet Protocol (IP) encapsulation of IP data packets, the logical unicast tunnel of the service provider network using an IP unicast protocol.

6. The computer-implemented method of claim 1, further comprising:

connecting Protocol Independent Multicast (PIM) instances within the virtual route forwarders of the VPN using an extended Virtual Local Area Network (VLAN), the VLAN including an Internet Protocol (IP) interface.

7. The computer-implemented method of claim 1, further comprising:

replicating the multicast data packet for each directly attached Customer Edge (CE) device; and forwarding replicated multicast data packets to corresponding CE devices without encapsulating the multicast data packet with the unicast outer header information.

8. A computer system for multicast data communication, the computer system comprising:

a processor; and a memory coupled to the processor, the memory storing instructions that, when executed by the processor, cause the system to perform the operations of:

examining control information of a multicast data packet received at a first data switching device, the multicast data packet including control information and a payload, the multicast data packet received as part of a virtual private network (VPN);

identifying remotely attached data switching devices to which to forward the multicast data packet based on the control information, the remotely attached data switching devices being logically connected to the first data switching device via a service provider network, wherein identifying remotely attached data switching devices to which to forward the multicast data packet based on the control information includes identifying remotely attached virtual route forwarders;

replicating the multicast data packet for each identified remotely attached data switching device;

encapsulating each replicated multicast data packet with outer header information, the outer header information identifying each replicated multicast data packet as a unicast data packet;

forwarding each encapsulated and replicated multicast data packet to a corresponding remotely attached data switching device via a logical unicast tunnel of the service provider network;

exchanging VPN routing information with remotely attached switching devices using Multi-Protocol extensions to Border Gateway Protocol (MP-BGP), each data switching device having one or more virtual route forwarders; and enabling a multicast routing protocol in each virtual route forwarder.

9. The computer system of claim 8, the memory storing further instructions that, when executed by the processor, cause the system to perform the operations of:

receiving, via the logical unicast tunnel within the service provider network, a second multicast data packet from a remotely attached data switching device, the second multicast data packet being encapsulated with an outer header identifying the second multicast data packet as a unicast data packet;

decapsulating the outer header of the second multicast data packet; and executing a multicast routing operation on the second multicast data packet based on corresponding control information.

10. The computer system of claim 9, wherein executing the multicast routing operation on the second multicast data packet based on corresponding control information comprises:

examining the decapsulated second multicast data packet in a virtual route forwarder of the first data switching device;

encapsulating the decapsulated second multicast data packet with an Ethernet header; and forwarding the second multicast data packet with the Ethernet header to a corresponding Customer Edge device locally attached to the first data switching device.

11. The computer system of claim 8, wherein identifying remotely attached data switching devices to which to forward the multicast data packet includes executing a VPN classification of the multicast data packet, the multicast data packet being received from a Customer Edge device, the first data switching device being a Provider Edge device.

12. The computer system of claim 11, wherein encapsulating each replicated multicast data packet with outer header information includes Internet Protocol (IP) encapsulation of IP data packets, the logical unicast tunnel of the service provider network using an IP unicast protocol.

13. The computer system of claim 8, the memory storing further instructions that, when executed by the processor, cause the system to perform the operations of:

connecting Protocol Independent Multicast (PIM) instances within the virtual route forwarders of the VPN using an extended Virtual Local Area Network (VLAN), the VLAN including an Internet Protocol (IP) interface.

14. The computer system of claim 8, the memory storing further instructions that, when executed by the processor, cause the system to perform the operations of:

replicating the multicast data packet for each directly attached Customer Edge (CE) device; and forwarding replicated multicast data packets to corresponding CE devices without encapsulating the multicast data packet with the unicast outer header information.

15. A computer program product including a non-transitory computer-storage medium having instructions stored thereon for processing data information, such that the instructions, when carried out by a processing device, cause the processing device to perform the operations of:

examining control information of a multicast data packet received at a first data switching device, the multicast data packet including control information and a payload, the multicast data packet received as part of a virtual private network (VPN);

identifying remotely attached data switching devices to which to forward the multicast data packet based on the control information, the remotely attached data switching devices being logically connected to the first data switching device via a service provider network, wherein identifying remotely attached data switching devices to which to forward the multicast data packet based on the control information includes identifying remotely attached virtual route forwarders;

replicating the multicast data packet for each identified remotely attached data switching device;

encapsulating each replicated multicast data packet with outer header information, the outer header information identifying each replicated multicast data packet as a unicast data packet;

forwarding each encapsulated and replicated multicast data packet to a corresponding remotely attached data switching device via a logical unicast tunnel of the service provider network;

exchanging VPN routing information with remotely attached switching devices using Multi-Protocol extensions to Border Gateway Protocol (MP-BGP), each data switching device having one or more virtual route forwarders; and enabling a multicast routing protocol in each virtual route forwarder.

16. The computer program product of claim 15, having further instruction that cause the processing device to perform the operations of:

receiving, via the logical unicast tunnel within the service provider network, a second multicast data packet from a remotely attached data switching device, the second multicast data packet being encapsulated with an outer header identifying the second multicast data packet as a unicast data packet;

decapsulating the outer header of the second multicast data packet; and executing a multicast routing operation on the second multicast data packet based on corresponding control information.

* * * * *